Jan. 6, 1959 W. P. STEED 2,867,734

DECOUPLED DIODE GATE CIRCUITS

Filed Feb. 8, 1954

INVENTOR

William P. Steed.

BY

Robert W. Hampton

United States Patent Office 2,867,734

Patented Jan. 6, 1959

2,867,734

DECOUPLED DIODE GATE CIRCUITS

William P. Steed, Oakland, Calif., assignor to Marchant Research, Inc., a corporation of California Application February 8, 1954, Serial No. 408,873

3 Claims. (Cl. 307—88.5)

The present invention relates to semi-conductor diode pulse gates, and more particularly to means for decoupling such gates from related circuits.

Modern high speed electronic computers and similar equipment often employ large numbers of trigger circuits. A standard trigger circuit briefly comprises a pair of vacuum tube triodes having the anode of each tube cross-coupled to the control grid of its companion tube. This circuit has two stable states of operation, namely, with either tube conducting and the other tube cut off, the circuit can be caused to alternate between its two stable states, or selectively set to either state, in response to input pulses.

Although it is usually desirable to have trigger circuits respond to pulses of only one polarity, most practical trigger circuits that are not critical in operation will respond to pulses of either polarity. But design limitations often require that pulses of both polarities be transmitted from a pulse source; it is necessary, therefore, to rectify input pulses into a trigger circuit so that the latter ultimately receives pulses of only one polarity. In accordance with the usual practice in the art, the following description will assume the desirability of passing only negative pulses to a trigger circuit input and blocking all positive pulses, but the invention will be seen to apply equally to the opposite type of rectification.

One kind of rectifier that is frequently employed in the input to a trigger circuit is a semi-conductor diode. A diode of this type has an inherently assymetrical resistance characteristic, so that it can be oriented to pass to the trigger circuit input only the desired negative pulses from a source of mixed pulses. By applying a changeable bias potential to the input side of the diode, in a manner well known in the art, a pulse gate can be formed from the diode. When the bias potential is at a first level, the diode blocks pulses of either polarity, and when the bias potential is at a second level, the diode passes negative pulses. Therefore, when the bias potential is at its second level, any negative input pulse causes electron current to flow from the pulse source to the trigger circuit, or conventional current to flow from the trigger circuit to the pulse source.

Although such diodes exhibit a high "back resistance" to current flow in one direction (in the present example, a high resistance to conventional current flow toward the trigger circuit), this back resistance is not infinite; therefore, the bias voltage causes a steady state conventional current flow through the back resistance of the diode to the trigger circuit if a path to ground a reference potential exists in that part of the trigger circuit which is connected to the diode. Usually, such a path does exist through a grid leak resistor, one of which connects the control grid of each tube of the trigger circuit to the reference potential. The current flowing through the grid leak resistor, due to the back resistance of the input diode, causes an increase in the normal control grid potential. The back resistance of a diode of this type generally decreases as the diode ages, thereby causing the potential of the associated grid to increase more and more until the trigger circuit eventually becomes unstable, and finally inoperative.

Since large numbers of gated trigger circuits are employed in certain types of electronic equipment, particularly in digital computers, it is readily apparent that a considerable amount of costly "down time" may be required for such equipment when trigger circuits misfunction as a result of aging diodes. The present invention reduces such down time by making the operational reliability of trigger circuits less dependent upon the retention by a diode of its initial characteristics.

Therefore, a principal object of the present invention is to provide means for decoupling a semi-conductor diode gate from a related circuit.

Another object of the invention is to isolate first and second circuit elements which mutually cooperate with a semi-conductor diode gate.

A further object of the invention is to provide isolating means for use with an input gate of a circuit element, whereby values of bias voltages for the gate may be chosen without regard to the values of voltages employed in the circuit element.

Another object of the invention is to reduce the down time of electronic equipment insofar as that down time is caused by abnormal diode characteristics.

Other objects will be apparent from the following description, reference being made to the drawings, in which.

Although the present invention can be employed with other circuit elements which are associated with diode gates, it is hereinafter described in the environment of a vacuum tube trigger circuit.

*Standard gated trigger circuits*

The basic characteristics of a circuit having two stable states of operation, such as the well-known Eccles-Jordan vacuum tube trigger circuit, are described in "Theory and Application of Electron Tubes" by H. J. Reich. In one of its simplest forms, a trigger circuit comprises two triode vacuum tubes with the grid of each tube cross-coupled to the anode of the other tube through a respective network comprising a resistor in parallel with a capacitor. One of the two tubes is always conducting, while its companion tube is non-conducting, thereby providing a circuit having two stable operating states.

Figure 1:
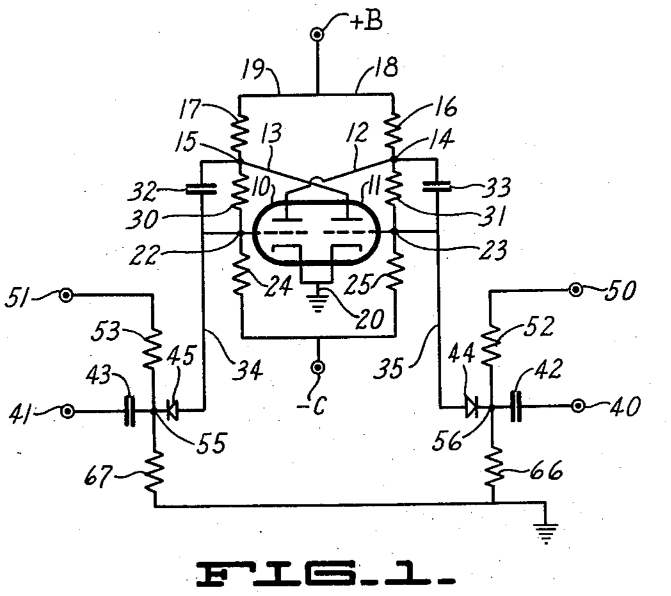
Fig. 1 is a circuit diagram of a standard gated trigger circuit.

A standard modification of the Eccles-Jordan circuit (Fig. 1) comprises two triodes 10 and 11, shown for convenience as the two sides of a twin triode. When the lefthand triode 10, hereinafter referred to as the "0 side," is conducting, the trigger is said to be "reset," and when the righthand triode 11, hereinafter referred to as the "1 side," is conducting, the trigger is said to be "set."

The anode of fthe 0 side is connected by a lead 12 through a junction 14, a resistor 16, and a lead 18 to a source +B of positive potential. In like manner, the anode of the 1 side is connected by a lead 13 through a junction 15, a resistor 17, and a lead 19 to the source +B. The cathodes of both sides are connected by a common lead 20 to ground. The 0 side grid is connected through a junction 22 and a resistor 24 to a source —C of negative potential. Similarly, the 1 side grid is connected through a junction 23 and a resistor 25 to the source —C. The 0 side grid is also connected to the anode of the 1 side through junction 22, a resistor 30 in parallel with a capacitor 32, junction 15, and lead 13. Similarly, the 1 side grid is connected to the anode of the 0 side through junction 23, a resistor 31 in parallel with a capacitor 33, junction 14, and lead 12. From the circuit described above, it is seen that a first voltage divider comprising resistors 17, 30 and 24 connects source +B to source —C, and that the current flowing through these resistors establishes, at junction 22, a bias potential for the 0 side grid. Similarly, a second voltage divider comprising resistors 16, 31 and 25 also connects source +B to source —C, and the current flowing through these resistors establishes, at junction 23, a bias potential for the 1 side grid.

A "reset" input terminal 41 is connected to the 0 side grid through a capacitor 43, a semi-conductor diode 45 which is oriented to pass negative pulses from terminal 41, a lead 34 and junction 22. In like manner, a "set" input terminal 40 is connected to the 1 side grid through a capacitor 42, a semi-conductor diode 44 oriented to pass negative pulses from terminal 40, a lead 35 and junction 23.

A terminal 51 is connected to a source of potential (not shown) which has a relatively low value and a relatively high value and which may be selectively set to either of these values. This source may be, for example, one anode of a second trigger circuit. Terminal 51 is connected through a resistor 53 to a junction 55 between capacitor 43 and diode 45, and junction 55 is connected to ground through a resistor 67. Therefore, resistors 53 and 67 form a voltage divider through which current flows from terminal 51 to ground, establishing a higher or lower bias potential at junction 55 in accordance with the higher or lower potential at terminal 51. The higher bias potential at junction 55 is chosen, by selecting appropriate values for resistors 53 and 67 and the higher potential at terminal 51, such that the left-hand side of diode 45 is maintained at a potential high enough to block negative pulses from terminal 41. The lower bias potential at junction 55 is similarly chosen such that the left-hand side of diode 45 is maintained at a potential low enough to permit that diode to pass negative pulses from terminal 41. A similar gate bias circuit comprising a terminal 50, and a pair of resistors 52 and 66, controls diode 44 at a junction 56 to gate negative pulses from terminal 40.

Since it is desirable to have current flowing through diodes 44 and 45 only in response to input pulses, the potential at the input side of each diode must be maintained more positive than the potential at its output side except for the duration of each negative input pulse which is intended to operate the trigger circuit. Therefore, the higher bias potential at junctions 55 and 56 must be more positive than the potential of the output sides of these diodes (junctions 23 and 22, respectively) by an amount equal to at least the amplitude of an input pulse, and the lower bias potential at junctions 55 must be at least equal to the potential at junctions 23 and 22. Therefore, since the potential at junction 55 is often higher than the potential at junction 22, conventional current can flow from terminal 51 through resistor 53, junction 55, the back resistance of diode 45, lead 34, junction 22 and resistor 24 to source —C, thereby adding to the normal current flow through resistor 24 (which is due to the voltage divider connection between source +B and source —C), and increasing the normal potential at junction 22. Similarly, current flowing from terminal 50 through resistor 52, junction 56, the back resistance of diode 44, lead 35, junction 23, and resistor 25 to source —C increases the normal potential at junction 23. As diodes 44 and 45 age, their back resistances may decrease considerably, so that the potentials at junctions 22 and 23 become high enough to cause misoperation of the trigger circuit.

*Decoupling means*

Figure 2:
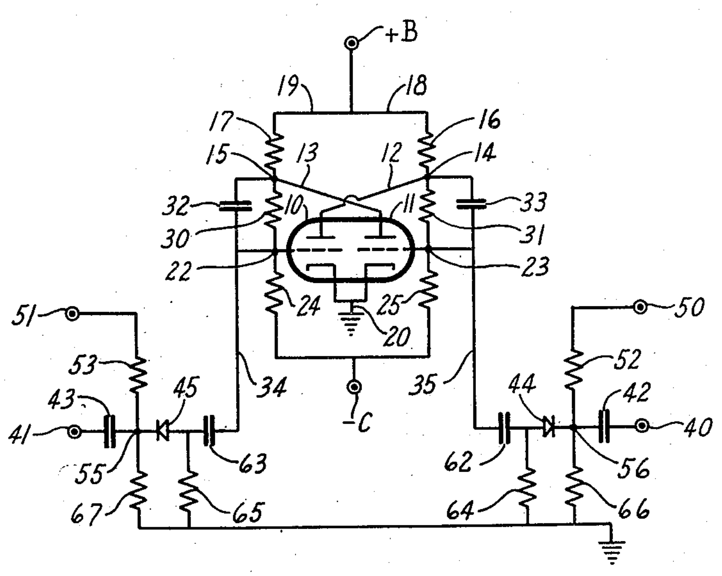
Fig. 2 is a circuit diagram of a modified gated trigger circuit employing the present invention.

The circuit shown in Fig. 2 includes decoupling means for preventing the above-described misoperation of the trigger circuit due to decreased back resistance of diodes 44 and 45. A capacitor 63 is interposed between diode 45 and junction 22, and a capacitor 62 is interposed between diode 44 and junction 23. A bleeder resistor 65 is connected to ground from a point between diode 45 and capacitor 63 to discharge the latter, and capacitor 62 is discharged by a similar bleeder resistor 64. Input pulses from terminals 40 and 41 are coupled by capacitors 62 and 63, respectively, to the trigger inputs, but the D. C. path from each terminal 50 and 51 to source —C is interrupted by these added capacitors. Therefore, the circuit is able to perform all of its described functions, but the flow of direct current through the back resistances of diodes 44 and 45 is prevented, so that the potentials at junctions 22 and 23 remain independent of any decrease in such back resistance.

I claim:

1. The combination of: a utilization circuit having at least one control element for receiving input signals; means for applying a predetermined bias potential to said control element; a source of input signals; a semi-conductor diode having an input and an output; a connection between said source and the diode input; means for applying a gating potential to the input of said diode; and a capacitor substantially constituting the sole connection between the output of the diode and said control element for preventing the flow of direct current between the input of said diode and said control element.

2. The combination of: a bistable device having at least one control element; means constituting a direct current connection from said control element to a point of reference potential; a source of input signals; a semi-conductor diode having an input and an output; a connection between said source of input signals and the diode input; means for applying a gating potential to the diode input; and a capacitor substantially constituting the sole connection between the output of the diode and said control element of the bistable device for preventing the flow of direct current between the gating potential means and said point of reference potential.

3. A gated trigger circuit, comprising: a pair of electron tubes, each tube having a control element; a direct current connection between at least one of said control elements and a point of fixed reference potential; a signal input terminal; a semi-conductor gating element having a substantially low forward resistance and high back resistance substantially less than infinite and having an input and an output; a capacitor connecting the signal input terminal to the input of said gating element; a gating potential input terminal; a resistor connecting the gating potential input terminal to the input of said gating element; a capacitor substantially constituting the sole connection between said gating element and said one of said control elements to prevent the flow of direct current between said gating potential input and said point of fixed reference potential; and a resistor connected between the junction of said gating element and said capacitor and a second point of fixed reference potential to discharge said capacitor.

References Cited in the file of this patent

UNITED STATES PATENTS

| | | |
|---|---|---|
| 2,589,465 | Weiner | Mar. 18, 1952 |
| 2,629,825 | Eckert et al. | Feb. 24, 1953 |
| 2,644,887 | Wolfe | July 7, 1953 |
| 2,679,617 | Mullaney et al. | May 25, 1954 |
| 2,787,707 | Cockburn | Apr. 2, 1957 |